Patented Mar. 10, 1953

2,631,115

UNITED STATES PATENT OFFICE 2,631,115

ELECTRODES FOR ELECTROCHEMICAL CELLS

Abraham L. Fox, Washington, D. C., assignor, by mesne assignments, to Manganese Battery Corporation, Riverdale, Md., a corporation of Delaware No Drawing. Application August 6, 1949,
Serial No. 109,061

7 Claims. (Cl. 136—138)

This invention relates to electrodes for electrochemical cells. It relates particularly to anodes for electroformation of oxidized compounds such as manganese dioxide and to depolarized cathodes for use in primary and secondary cells.

It has for its aim the provision of electrically conducting articles which are suitable for the deposition of oxidized compounds electrochemically or chemically and which when so treated form highly efficient depolarizers for primary and secondary cells. It also has for its aim the provision of depolarized electrodes which show increased voltages over the usual graphite electrodes depolarized in the same way.

I have found that when porous titanium is made an anode in certain electrolytes, it does not prevent the flow of the current as does massive titanium but passes current with a very high over-voltage for oxygen discharge. Apparently a very considerable amount of oxygen is adsorbed on the titanium surface in one form or another because very little evolution of oxygen from the anode is observed even when considerable current is flowing and hydrogen evolution from the cathode is copious.

A mass of porous titanium thus treated in electrolytes, some of which will be described in detail, at current densities, voltages and temperatures, which will also be described for specific examples, has new and useful properties as an electrode. These properties define the article of my invention and the several methods which will be set forth for preparing it are illustrative only. Other methods will no doubt present themselves to those skilled in the art, without departing from the teaching of my invention.

While electrode of my invention can be made by anodizing titanium in dilute sulphuric acid, the stability of the electrode is improved by simultaneously depositing on the titanium surface a depolarizer, such as $MnO_2$, and the resistance of the cell in which the electrode is used is decreased by coating the surface of the porous titanium mass with an inert conductor, such as graphite, before its electrolytic formation.

The characteristic properties of such an electrode are its high efficiency when used as an anode for electrolytic oxidation, e. g. in the preparation of manganese dioxide; its high potential when used as a depolarized electrode in an electrolytic cell for the generation of current, e. g. when coated with manganese dioxide and made a cathode in the usual Le Clanche cell, the open circuit voltage is 2.1 as compared to 1.65 when a graphite electrode coated with manganese dioxide is used.

The potential of a current producing cell using the porous titanium electrode of my invention is dependent on the depolarizer which is in contact with the electrode. The potential of such a cell, however, is always about 0.5 volt higher than that of the same cell when the depolarizer is used with a graphite electrode instead of the porous titanium electrode. For example, with silver chloride as depolarizer against zinc in standard Le Clanche electrolyte, the cell voltage is normally about 0.9. When silver chloride is deposited on the titanium anode of my invention, the voltage is 1.45.

A number of specific examples of the use of my electrode will be given which will establish the characteristics and methods of preparation and use. I do not predicate my invention on any particular theory of behavior; however, as the electrochemical characteristics of cells employing my electrode are highly unusual, some discussion of the possible mechanism of operation may enable a better understanding of my invention.

Since the potential of cells employing my electrode but otherwise similar to common electrochemical systems is significantly higher, the cell reaction must be different. This is further established by the fact that secondary cells using my electrode may be made which have more than 100% current efficiency, that is, they return more ampere hours on discharge than was put into them on charge. The watt hours, of course, are less on discharge than on charge. This is the effect which would be obtained if a group of cells were charged partly in series and partly in parallel and discharged with a different parallel-series relationship. Such a situation is thought to be brought about by the difference of resistance of the titanium electrolyte contact when the titanium is an anode and a cathode respectively. This situation gives rise to another unusual feature of my electrode when used in a cell. To obtain the desired properties, it is not sufficient that current density be regulated but the electrode voltage drop during formation must exceed the voltage drop which it is desired to obtain at the electrode in use.

I will now give examples to illustrate embodiments of my invention with a number of variables. I will, for example, illustrate the use of porous titanium prepared by (a) compacting titanium chips, (b) compacting and sintering titanium chips, (c) distilling $MgCl_2$ from sponge titanium prepared by reduction of $TiCl_4$ with Mg, (d) dissolving $MgCl_2$ from sponge titanium prepared as above, and (e) titanium produced by decomposing titanium hydride. The forms of titanium mentioned are purely illustrative. I have found that any porous mass of titanium may be used for the practice of my invention. The optimum degree of porosity for the various embodiments of my invention will appear from a consideration of the several examples.

I will also illustrate the decrease in resistance between the electrode and electrolyte which is brought about by coating the outer surface of the porous titanium mass with (a) graphite, (b) gold and (c) iron. Here again these are to be taken as illustrative. I have found that any good conductor which is inert to the electrolyte may be used, e. g. platinum.

I will also illustrate a number of electrolytes which may be used for the preparation of my electrode, including manganese sulphate, sodium plumbite, sulphuric acid. Other manganese and lead salts and other acids may be used as well as other salts producing a solid anodic product.

I will also illustrate several electrolytes in which my electrode can be advantageously used for several purposes. These will include manganese sulphate, manganese and zinc sulphates, ammonium and zinc chlorides, potassium hydroxide and potassium zincate. These examples, like the previous ones, are illustrative.

Finally, I will illustrate the use of my electrode for several purposes, including the manufacture of anodic oxidation products, the preparation of depolarizing cathodes for primary cells, and electrodes for secondary cells. The number of such products is large and the variety of cells which may be advantageously made is large. I will illustrate the use of my electrode for the preparation of electrolytic $MnO_2$. It may also be used for making $PbO_2$ and for the manufacture of persulphates, chromates and the oxidation of organic compounds.

I will illustrate the use of my electrodes in cells using the Le Clanche system and in secondary cells using zinc electrodes and the electrodes of my invention in an electrolyte of zinc and manganese sulphate. I will also illustrate the use of my electrode in cells having an alkaline electrolyte and depolarized with silver peroxide. I will also illustrate the use of my electrode in cells depolarized with silver chloride. These examples are purely illustrative.

*Example I*

I take titanium chips produced by comminuting the reduction product of $TiCl_4$ with Mg and leaching such product with dilute hydrochloric acid. The chips are of approximately 35 mesh screen size. I compress such chips into a compact mass under a pressure of 10 tons per square inch. The apparent density of such a mass is 2.0 corresponding to more than 50% voids. The volume is .25 cubic inch per square inch of outer surface. I coat this titanium mass with graphite and make it the anode in an aqueous electrolyte containing 150 grams per liter of $MnSO_4$ and 50 grams per liter of $H_2SO_4$. I place a graphite cathode in this solution and heat to 90° C. I pass a unidirectional current between the electrodes at a current density of 500 milliamperes per square inch of outer electrode surface. The voltage drop is 1.8. The current is passed for 30 minutes. The resulting electrode is now ready for use in a variety of ways. It may be used for the continuing deposition of $MnO_2$ from the same solution at high current efficiencies up to 50 amperes per square foot. It may be used as a depolarized electrode in a variety of cells. The E. M. F. measured against zinc in the usual Le Clanche electrolyte is 2.1.

*Example II*

I take sponge titanium prepared by distilling magnesium chloride from the reduction product of $TiCl_4$ with Mg and shape to form an electrode. Such material is very porous having an apparent density of only 1.5. I make this material an anode in hot manganese sulphate solution and form it as in Example I. The volume is 0.5 cubic inch per square inch of exposed surface. I then make it an electrode in a cell having also a zinc electrode and an electrolyte containing 150 grams per liter of $MnSO_4$, 100 grams per liter of $ZnSO_4$ and an excess of ZnO. This electrolysis is carried on at room temperature. Such a cell has a voltage of 2.0. This cell is discharged down to less than one volt and is then charged by passing a unidirectional current so as to deposit zinc on the zinc and $MnO_2$ on the titanium electrode. The apparent current density is 200 milliamperes per square inch and the voltage 2.4 during charge. Two thousand milliampere hours are charged into the cell. It is then discharged at 30 milliamperes per square inch, the initial operating voltage being 1.95. When the voltage has dropped to 1.0, the total milliampere hours discharge is 2850. This charging and discharging procedure is cyclic and may be repeated indefinitely. If the charging current is 100 milliamperes per square inch and the voltage drop druing charging 1.4, the cell will not be charged at all but on the other hand will discharge.

*Example III*

I take titanium chips and compact them at 5 tons per square inch. I then sinter in vacuum at 750° C. for 5 hours. The result is a very porous mass with adequate mechanical strength for use as an electrode. The volume is 0.2 cubic inch per square inch of exposed surface. I make this electrode an anode in dilute sulphuric acid, the other electrode being graphite. I pass a unidirectional current of 500 milliamperes per square inch of electrode surface for 30 minutes. The voltage drop is 3.6. The electrode when formed in this way has a voltage against zinc in standard Le Clanche electrolyte of 2.1 but is readily polarized. The depolarizer in this case is presumably oxygen.

*Example IV*

I take a suitably shaped mass of the reduction product of $TiCl_4$ with Mg and dissolve the magnesium chloride and excess Mg out with dilute hydrochloric acid. I form an electrode of this mass in a manganese-sulphate sulphuric acid electrolyte as in Example I. I then saturate the porous mass with silver nitrate and precipitate a coating of silver chloride by immersing the mass in hydrochloric acid. I make the so-coated electrode a cathode in a standard Le Clanche cell. The voltage is 1.45 and very high currents can be drawn without polarization.

*Example V*

I take titanium hydride and compact it into suitable form. I heat this in vacuum at 750° C. to form porous metallic titanium. I immerse this porous mass in silver nitrate solution. Enough hydride remains in the mass so that the surface becomes coated with silver. I then make this silver coated titanium mass an anode in a cell having an electrolyte of 70% KOH and an amalgamated zinc cathode. I pass a current of 400 milliamperes per square inch of electrode surface for 10 hours. This produces a silver peroxide depolarizer on the titanium surface. The potential of such a cell is 1.95 and heavy currents may be drawn without depolarization.

*Example VI*

This example is a duplicate of Example I except that the graphite coating of the Ti is omitted. As a result, the voltage drop in the formation of the electrode is 4.6 instead of 1.8. The E. M. F. of the electrode measured in the usual Le Clanche cell is 2.1 exactly the same as before but the internal resistance of the cell is substantially higher than when the electrode is coated with graphite.

*Example VII*

The sponge titanium used in this example is like that of Example II. It is coated with fine iron powder and made an electrode in a solution of potassium plumbite made by dissolving 10 grams of PbO in 100 cc. of 70% KOH. The other electrode is lead and a unidirectional current is passed between the two electrodes at 500 milliamperes per square inch of outer electrode surface. The voltage drop is 3.2. Lead peroxide is deposited in the titanium and 3000 milliampere hours of current are charged. The formed cell now has a voltage of 2.3. The lead electrode may be replaced with zinc giving a voltage of 2.8. Such a cell may be discharged at high current densities.

*Example VIII*

I take a piece of sponge titanium as in Example V. It is immersed in gold chloride solution to partially coat the titanium surface. It is then formed in a hot manganese sulphate electrolyte as in Example I and finally electrolyzed in the manganese sulphate solution to the extent of 3000 milliampere hours. The electrode so prepared is made a cathode in a cell having a zinc electrode and an electrolyte of zinc and ammonium chlorides. The cell has a voltage of 2.2 and may be discharged to one volt with the production of 4000 milliampere hours of current. It may then be charged again by the application of 2.6 volts and a current density of 500 milliamperes per square inch of outer electrode surface. This process may be repeated an indefinite number of times.

I have illustrated my invention with substantially pure titanium metal. Alloys of titanium in which the alloying element does not significantly alter the electrochemical properties of the titanium may also be used, such as alloys containing up to 10% of zirconium, aluminum, iron, nickel or cobalt. Inert materials, such as titanium, nitride and carbide, may also be admixed with the porous titanium.

Having thus described my invention and illustrated it by many examples, its advantages over the known art will be clear. They may, however, be summarized. The electrode of my invention provides a chemically inert anode which is more efficient in oxidizing reactions than those heretofore available. The electrode of my invention also provides higher voltages when used with many electrochemical systems for primary cells and makes possible the use of such systems in secondary cells.

What is claimed is:

1. An electrically conducting article suited to use as an electrode in a battery, said electrode being capable of discharge at a higher potential level than heretofore available manganese dioxide depolarized electrodes and comprising a highly porous mass having a major proportion of metallic titanium and a coating of manganese dioxide on at least a part of the titanium surface.

2. An electrically conducting article suited to use as an electrode in a battery, said electrode being capable of discharge at a higher potential level than heretofore available manganese dioxide depolarized electrodes and comprising a highly porous mass having a major proportion of metallic titanium, a coating of a chemically inert conductor on at least part of the titanium surface and a coating of a depolarizing substance on at least part of the surface.

3. The article of claim 1 further characterized by the depolarizer being silver chloride.

4. The article of claim 1 further characterized by the depolarizer being lead peroxide.

5. The article of claim 2 further characterized by the depolarizer being manganese dioxide and the inert conductor being graphite.

6. An electrically conducting article suited to use as an electrode in a battery, said electrode being capable of discharge at a higher potential level than heretofore available manganese dioxide electrodes and comprising a highly porous mass of metallic titanium and a coating of manganese dioxide predominantly in the gamma form on at least part of the titanium surface.

7. An electrically conducting article suited to use as an electrode in a battery, said electrode being capable of discharge at a higher potential level than heretofore available manganese dioxide electrodes and comprising a highly porous mass of metallic titanium and a coating of electrodeposited manganese dioxide on at least part of the titanium surface.

ABRAHAM L. FOX.

REFERENCES CITED

The following references are of record in the file of this patent:

UNITED STATES PATENTS

| Number | Name | Date |
|---|---|---|
| 377,340 | Urquhart et al. | Jan. 31, 1888 |
| 668,215 | Reed | Feb. 19, 1901 |
| 759,065 | Betts | May 3, 1904 |
| 934,988 | Adolph | Sept. 28, 1909 |
| 1,170,819 | Kaplan | Feb. 8, 1916 |
| 1,737,130 | Storey et al. | Nov. 26, 1929 |
| 2,292,026 | Gillett | Aug. 4, 1942 |

FOREIGN PATENTS

| Number | Country | Date |
|---|---|---|
| 143,327 | Great Britain | May 25, 1920 |